United States Patent [19]

Scalisi et al.

[11] Patent Number: 5,574,772
[45] Date of Patent: Nov. 12, 1996

[54] PERSONAL APPARATUS FOR RECEIVING RADIOTELEPHONE COMMUNICATIONS

[76] Inventors: Joseph F. Scalisi, 711 Arabian La., Walnut, Calif. 91789; Julio C. Smiriglio, 2435 Paso Real St., Rowland Heights, Calif. 91748

[21] Appl. No.: 330,358

[22] Filed: Oct. 27, 1994

Related U.S. Application Data

[63] Continuation-in-part of Ser. No. 146,910, Nov. 1, 1993, abandoned.

[51] Int. Cl.⁶ .................................................. H04Q 7/32
[52] U.S. Cl. .................... 379/58; 379/63; 455/90
[58] Field of Search .................... 379/56, 57, 58, 379/59, 433, 63; 455/33.1, 54.1, 89, 90, 347, 351

[56] References Cited

U.S. PATENT DOCUMENTS

| | | | |
|---|---|---|---|
| 4,845,772 | 7/1989 | Metroka et al. | 379/61 |
| 4,908,848 | 3/1990 | Hanawa | 379/63 |
| 5,117,449 | 5/1992 | Metroka et al. | 379/58 |
| 5,203,003 | 4/1993 | Bogusz et al. | 455/33.1 |
| 5,228,026 | 7/1993 | Albrow et al. | 379/63 |
| 5,365,570 | 11/1994 | Boubelik | 379/59 |

*Primary Examiner*—Curtis Kuntz
*Assistant Examiner*—William G. Trost
*Attorney, Agent, or Firm*—James G. O'Neill

[57] ABSTRACT

A complete, facile to use and operate telephone apparatus (10) for use with a communications system including a toll charge telephone system (104). The apparatus is a simplified telephone receiver with no keypad to allow only incoming calls to be received 5 thereon. The system includes a communications system connected to a toll charge telephonic system whereby incoming calls charged only to a caller, at a reduced rate, may be processed. The device is adapted to only receive incoming telephone calls and to transmit radiotelephone signals upon receipt of such a call.

12 Claims, 3 Drawing Sheets

PERSONAL APPARATUS FOR RECEIVING RADIOTELEPHONE COMMUNICATIONS

BACKGROUND OF THE INVENTION

CROSS REFERENCE TO RELATED APPLICATION

This is a continuation-in-part of copending application ser. no. 08/146,910, filed on Nov. 1, 1993, now abandoned.

1. Field of the Invention

This invention relates generally to personal communications devices and systems, and more particularly, to an improved and simplified device for use with a communications system including a toll call telephone system.

2. Description of Related Art

Radiotelephone systems, commonly referred to as cellular telephone systems, wireline, radio frequency telephone, and paging systems are widely used to maintain communications between parties while away from their offices or residences. These systems are used to pass on or receive messages from a caller, or to monitor incoming calls.

Problems exist with known systems, such as paging. Since paging is a one-way communications means, it requires a person paged to find a telephone to answer the page. A problem with cellular telephone systems, is a person carrying the telephone might not receive a call directed to the cellular telephone. Reasons why a cellular telephone user might not receive a call include the user might be out of the area covered by the cellular telephone system antennas, the cellular telephone might be turned off, or not be in possession of the user, at the time of the call.

Various solutions have been proposed to overcome the shortcomings of paging systems and cellular telephones. One solution is to provide a combined cordless telephone device and pager. Such devices are shown in U.S. Pat. Nos. 5,040,204, 5,109,539, 5,117,449 and 5,148,473. However, a disadvantage of these disclosed devices is they are complicated to use and expensive to acquire. A further disadvantage is that it is expensive and somewhat complicated to operate the devices in their systems. Furthermore, access to these known devices are not easily controlled by the user, other than by shutting the device off entirely, or not giving out a pager or telephone number, thereby defeating the purpose of having the device.

Moreover, the known portable telephones for use with cellular telephone systems, or combined telephone paging systems, as disclosed in the U.S. Patents discussed above, although becoming lighter and less complicated, still tend to be expensive to use and/or manufacture. Examples of simplified devices for use with cellular telephone systems are shown in U.S. Pat. Nos. 4,845,772, 5,109,539, 5,027,394, 5,216,711 and 5,241,592. A disadvantage of these lighter and simplified cellular telephones that is unacceptable to some users and/or callers is that they still have to pay for cellular calls. Another disadvantage of these devices is that they are susceptible to fraud by unscrupulous individuals. Therefore, a need has arisen to provide an improved simplified device for use with known or emerging telephonic or similar type communications systems to enhance the ability of a person, to control costs, monitor incoming calls, and reduce fraud. However, no generally acceptable device, method, or system now exists which provides the required device and/or system to interact with communication systems to adequately meet the needs of such users.

There is, therefore, a need for a device and/or system to interact with available or emerging communication systems, to receive incoming communications, which device prevents the user from making outgoing calls, to control costs and fraud, but which accepts incoming calls. The present invention comprises a device which will only receive calls from a caller who places a call to a selected telephone number on a toll call system. The device contains no keypad or related circuitry, so that no outgoing calls may be made on the device, thereby drastically reducing the chances of fraud occurring, but may be used to receive calls, and to thereby communicate directly with a caller.

SUMMARY OF THE INVENTION

It is, therefore, an object of the present invention to provide an improved system for mobile personal communications.

It is another object of the present invention to provide a device for use with a communications system, that may only receive incoming calls on the system.

It is a further object of the present invention to provide a facile method that enables a caller to contact a specific telephone number of a second party on a communications system, without one or both of the parties being charged for both the incoming and received call.

It is still another object of the present invention to provide a communications system which utilizes a device that is linked to a communications system in such a manner that only the calling party will be charged for the toll call placed on the connecting telephone system.

And, it is yet a still further object of the present invention to provide a method and device for selectively receiving incoming calls only from a telephone system at a reduced cost, and wherein fraud prevention is paramount.

In accordance with the present invention there is provided a complete, facile to use and operate device for interacting with a communications system which is designed to assist the user in controlling costs and prevent fraud in the use thereof. The method of the present invention includes the steps of tying the device into a dedicated toll charge telephone system that may only be accessed by a calling party utilizing a dedicated telephone number to place a call to a device that only receives such calls, but which cannot make outgoing calls.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide for an improved and simplified device and system for interfacing with a telephone or similar communications system, in any selected location, for enabling a caller to contact a user of the device by radiotelephone.

By way of example, and not by way of limitation, set forth below is a description of a preferred embodiment of the simplified device of the present invention which may be used for incoming-only calls so as to limit telephone charges to the device, and in certain cases to thwart criminal intent.

Figure 1:
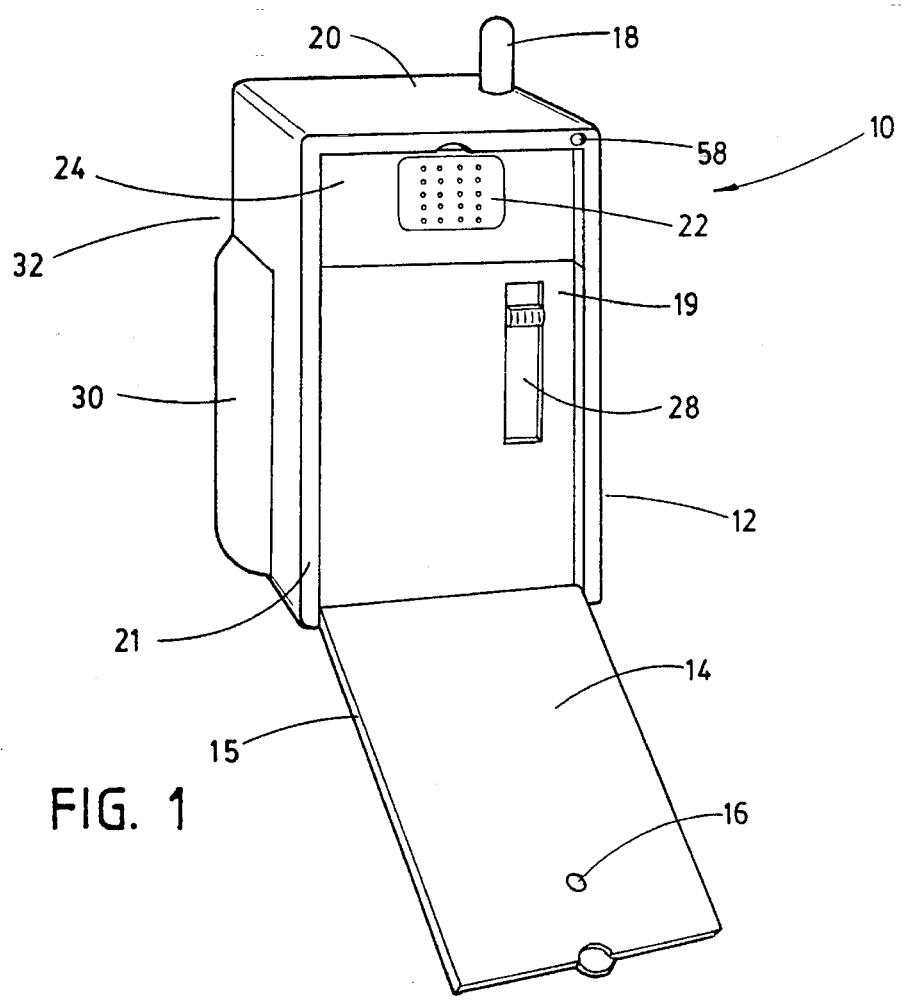
FIG. 1 is a perspective view of a preferred embodiment of the device of the present invention.

Turning now to the drawings, and, in particular, FIG. 1, a preferred embodiment of the simplified one-way telephone device of the present invention that may be used in various communications systems is illustrated at 10. The unit 10 comprises a body 12 and a rotatably coupled flip element 14. In the preferred embodiment 10, the body 12 and flip element 14 comprise a hard plastic or other suitable material. The body 12 may be any desired size, but in a preferred version is substantially 4 inches in height, 2 inches in width and 1 inch in thickness. The flip element 14 is substantially 3½ inches in length and 1½ inches in width. The body 12 includes a recessed face portion 19, having no keypad or other call producing elements thereon, for receiving the flip element 14, such that an outer surface 15 of the flip element 14 is flush with a front side 21 of the body 12. The flip element 14 has a microphone 16 affixed therein.

The body 12 includes an antenna 18, which may be contained internally in a known manner, or may extend outwardly from a top side 20, and a speaker 22 disposed in the body 12. The speaker 22 is located near the top side 20 and affixed to an interior portion of the recessed face 19 of the body 12.

A switching means 28 may extend through the recessed face 19 or may be placed at either side of the device so as to provide a perfectly flat recessed face portion 19. A further switching means comprising a push button (not shown) or any other known means may be positioned so that the flip element 14 opens and closes this switching means on opening and closing the flip element. That is, when the flip element 14 engages recessed face 19, the unit 10 will be in the sleep state, while when the flip element is opened the unit 10 will be in the activated state, ready to receive a call, as described more fully below.

Switching means 28 may comprise a three pole or similar type switch, that is used for such functions as switching the device on or off, switching to a tone or vibrator mode, or for enabling and disabling radiotelephone communications. Additional knobs, push buttons or switches (not shown) may be added to the sides of the device, and used for such functions as volume control.

A detachable, rechargeable battery pack 30 may be slidably coupled to a back side 32 of the body 12 for providing power to electronic circuitry of the unit 10. An optional L.E.D. 58 may be located on the front surface 21 of the body 12 or on the recessed face 19. The L.E.D. 58 would be used to indicate when the output of the battery 30 drops below a desired level.

Figure 2:
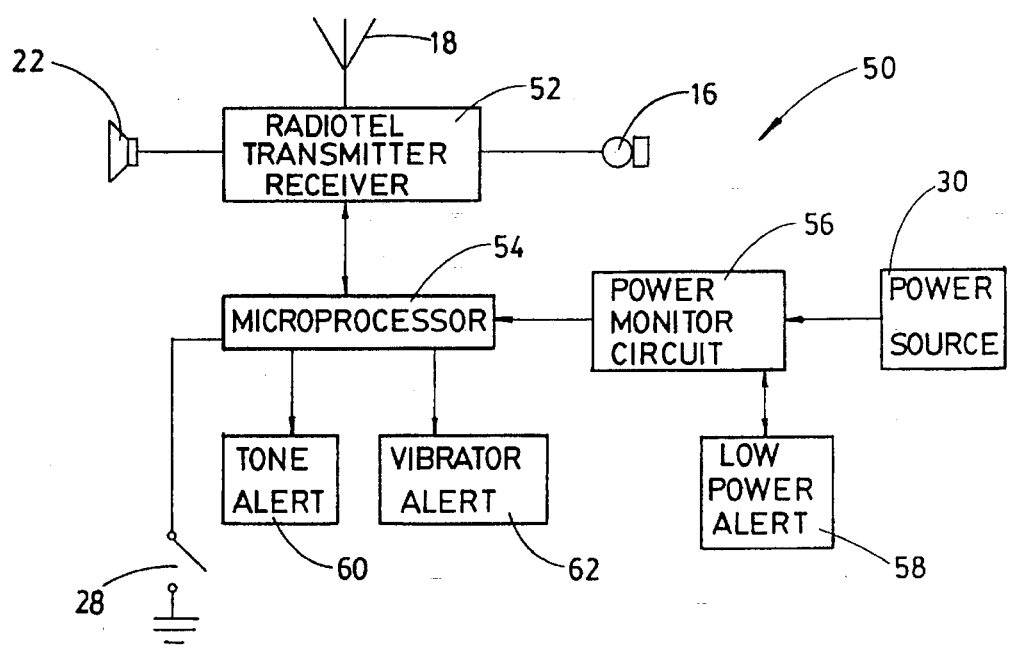
FIG. 2 shows a block diagram of electronic circuitry of the device of FIG. 1.

Referring to FIG. 2 of the drawings, there is shown a block diagram 50 of electronic circuitry of the unit 10. The antenna 18 is used to receive and transmit radiotelephone signals using a receiving and transmitting circuit 52. The receiving/transmitting circuit 52, may comprise more than one circuit (see FIG. 4 and explanation below) and may be assembled using components and methods well known in the art. A microprocessor 54 is coupled to the receiving/transmitting circuit 52. The microprocessor 54 is also coupled to the speaker 22 and to the microphone 16 through the receiving/transmitting circuit 52 for radiotelephone communications.

The microprocessor 54 may be specifically designed for use with, or may comprise any well known integrated circuit chip that can be adapted to perform such functions as controlling radiotelephone communications, so as to only produce transmitted signals, after a correct received signal is received and verified, as described more fully below.

The battery pack 30, or other power source, is coupled to the microprocessor 54 through a power monitor circuit 56. The power monitor circuit 56 monitors the output level of the battery 30. If the output voltage of the battery 30 drops below a desired level, the circuit 56 will send a signal to a low power indicating means, such as the L.E.D. 58, for example.

The microprocessor 54 may be coupled to a tone alert circuit 60 and/or to a vibrating alert mechanism 62. A gate (not shown) may be interposed between the microprocessor 54 and the alert circuit 60 or vibrating mechanism 62. In the embodiment shown in FIG. 2, the microprocessor 54 receives a signal from the receiving/transmitting circuit 52. The microprocessor 54 determines if the received signal is a correct radiotelephone signal. If the signal received by the microprocessor 54 is a correct radiotelephone signal the microprocessor 54 sends a signal to the tone alert circuit 60 by controlling the gate, or alternatively to vibrating alert mechanism 62, by controlling the gate.

The switching means 28 is coupled to the power source 30 through the microprocessor 54. The switching means 28 is used to activate and deactivate the unit 10.

Figure 3:
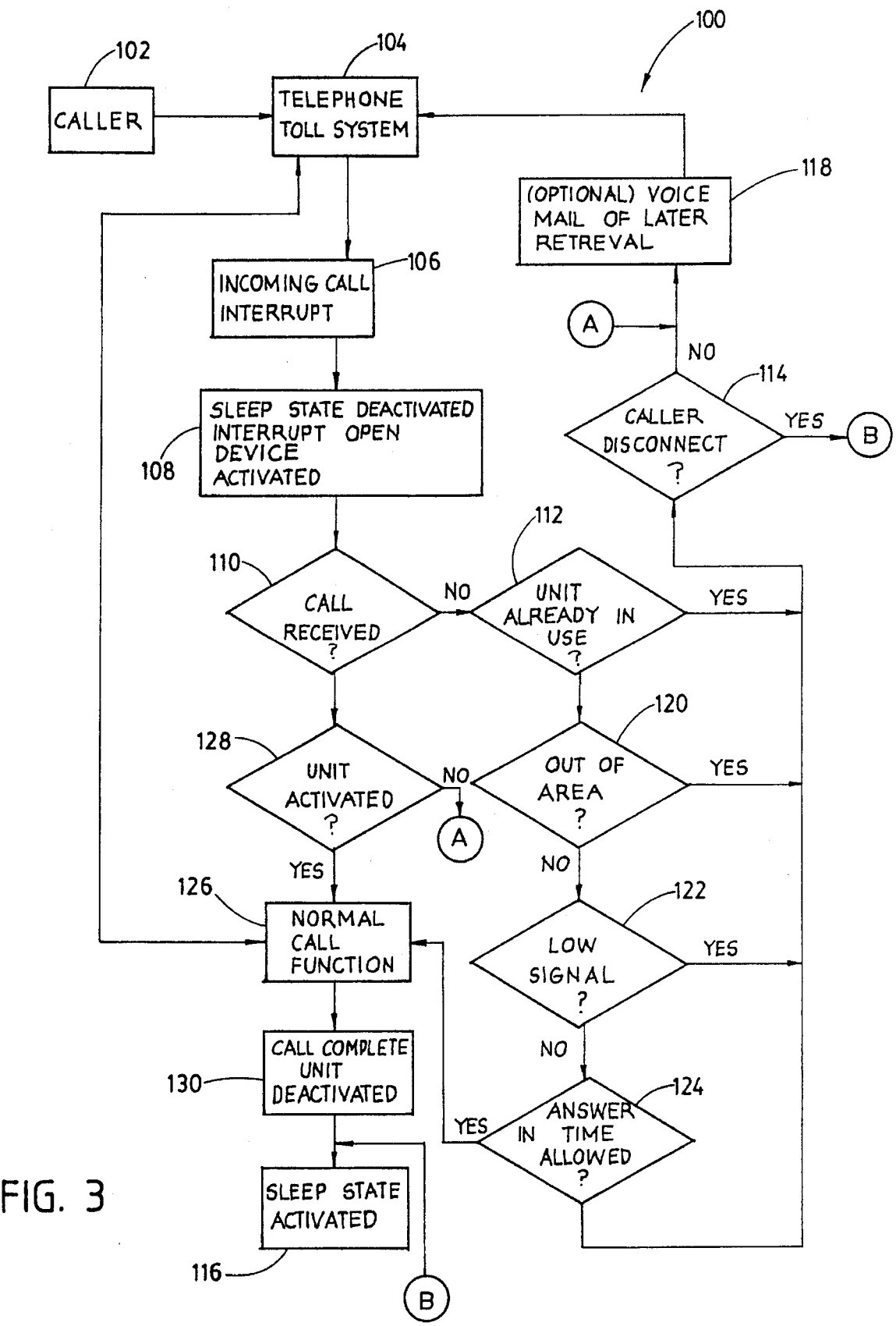
FIG. 3 is a flow chart depicting a process of operation of the device of the present invention with a communications system, such as a toll charge telephone communications system.

FIG. 3 shows a flow chart 100 of a process of operation of the present invention 10 with toll charge telephone communications system 104. In use, a caller 102 trying to contact, by radiotelephone communication, the unit 10, calls a telephone toll charge system 104. The system 104 may include an optional voice mail means and operates to switch the incoming call to the unit 10. When the incoming call is received by the unit 10, an incoming call interrupt 106 is triggered and the unit 10 is activated from a sleep state, as shown in box 108. The system 104 determines if the call was received by the unit 10, shown in box 110. If the call was not received, the system 104 determines if the unit 10 is in use, 112. If the unit 10 is in use, the system 104 has to determine if the caller 102 has disconnected 114. If the caller 102 has disconnected 114, unit 10 returns to sleep state 116. If the caller 102 has not disconnected 114, the caller may be able to leave a voice mail message 118 for the user, if the system 104 has that capacity.

If the unit 10 is not in use 112, the system 104 determines if the unit 10 is out of a service area 120. If the unit 10 is out of the service area 120, the system 104 returns to decision 114. If the unit 10 is in the service area 120, the system 104 determines if the signal received by the unit 10 is too low for transmission 122. If the signal received by the unit 10 is too low for transmission 122, the system 104 returns to decision 114. If the signal received by the unit 10 is not too low for transmission, the system 104 determines if the unit 10 responds to the incoming signal within a predetermined time 124. If the unit 10 does not respond to the incoming signal within the predetermined time 124, then the system 104 again returns to decision 114. If the unit 10 responds to the incoming signal, then normal radiotelephone communications 126 between the caller 102 and the unit 10 are initiated.

Returning to decision box 110, if the call was received by the unit 10, the system 104 determines if the unit 10 is activated 128. If the unit 10 is not activated, then the caller 102 has the option of leaving a voice mail message 118 for the unit 10. If the unit 10 is activated, then normal radiotelephone communications 126 between the caller 102 and the unit 10 are initiated. When radiotelephone communications are complete, the unit 10 is deactivated 130, and sleep state is again activated 116.

Figure 4:
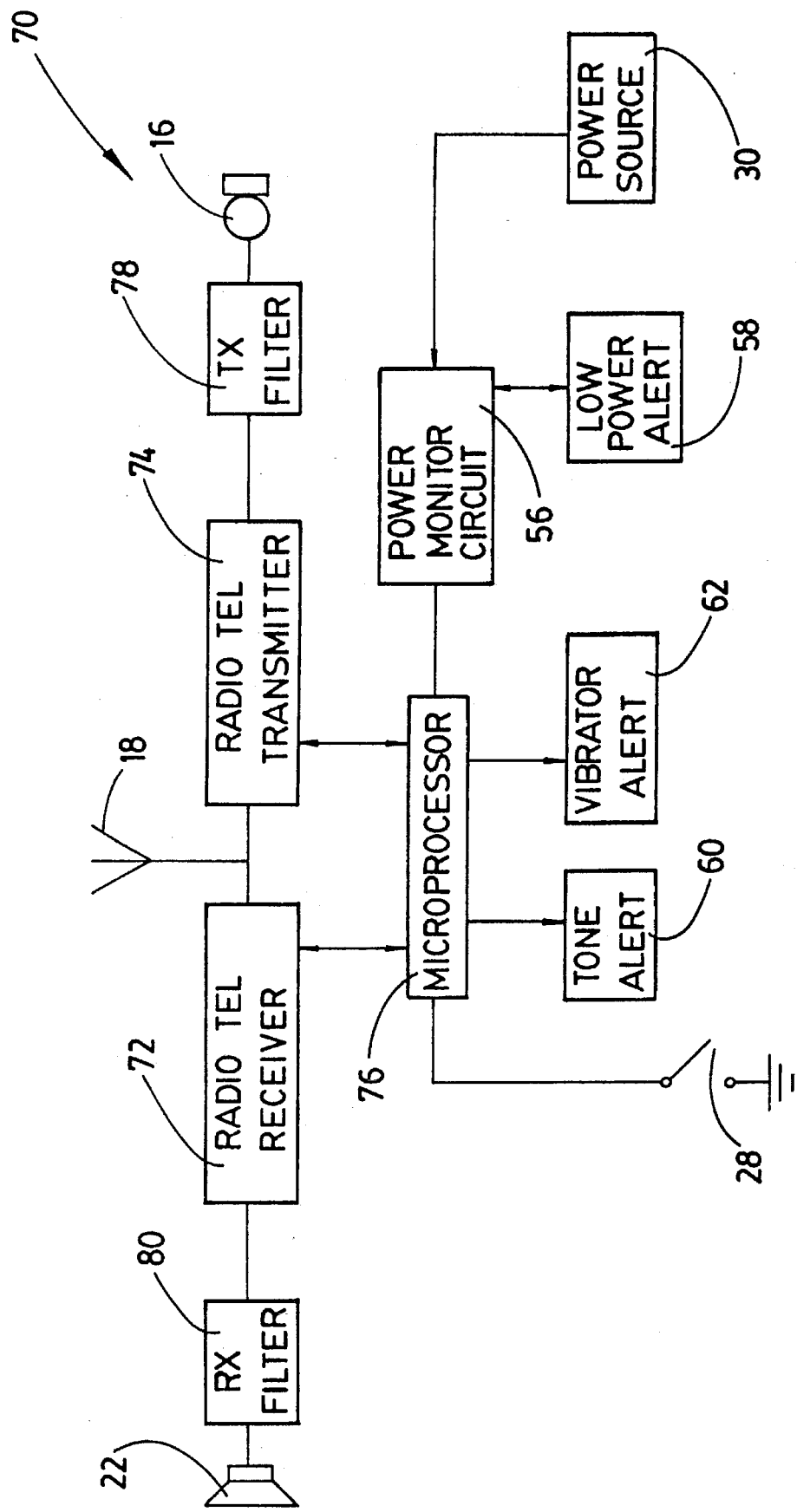
FIG. 4 shows a block diagram of further electronic circuitry for the device of the present invention.

Referring now to FIG. 4 of the drawings, there shown is a block diagram 70 of a further embodiment of the electronic circuitry of the unit 10. The antenna 18 is used to receive and transmit radiotelephone signals to and from separate receiving circuit 72 and a transmitting circuit 74. The receiving and transmitting circuits 72 and 74, may be assembled using components and methods well know in the art. A microprocessor 76 is coupled to the receiving and transmitting circuits 72 and 74, and to the speaker 22 through a filter means 80 and to the microphone 16 through a filter means 78.

The microprocessor 76 is specifically designed to operate as follows:

When the unit 10 is on, the microprocessor 76 will normally only permit the unit to be in a sleep state, where no out going communication can be made. Only when a signal is received from an outside caller having the correct mobile identification ("M.I.D.") number of the specific unit 10 will the microprocessor allow two-way communication to be made. To enable such two-way communication, an incoming signal must be received by the antenna 18 and travel to the radio telephone receiver 74, where it is routed to the microprocessor 76. The microprocessor 76 then determines if the M.I.D. number of the incoming call is correct. Upon verification of the M.I.D. number, the microprocessor 76 will activate an alert signal, such as the tone or vibrator means in the unit 10. If device 10 is then fully opened (i.e., flip element moved to open position), and not in use, a further switch means is activated in the unit 10. This activation of the further switch means enables the microprocessor to activate the radio telephone transmitter 74 so that the unit 10 will receive incoming signals and transmit outgoing signals to thereby allow a conversation to take place between the caller and the user of the unit.

Thus, there has been described an improved simplified device for receiving radiotelephone communications. Since the disclosed device does not include a keypad and is adapted to receive calls and not initiate calls, telephone toll charges and fraud may be substantially reduced.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A radiotelephone transceiving apparatus operative in a radiotelephone communications system comprising:

a housing with no keypad thereon, and no keypad circuitry therein, so that said transceiving apparatus is a one-way, incoming call only receiving apparatus and no outgoing signals may be initiated by a user on said transceiving apparatus;

said housing also includes receiving means for receiving radiotelephone signals;

transmission means for transmitting radiotelephone signals, only upon receipt of radiotelephone signals by said receiving means, whereby said transceiving apparatus may only be used to supervise a two-way voice communication initiated from another telephone apparatus;

processing means coupled to the transmission means and to the receiving means, said processing means processing received signals and only transmitting radiotelephone signals in response to receipt of a signal having the correct mobile identification number of said transceiving apparatus, said processing means having no means for creating an outgoing addressing signal, so that no radiotelephone signals may be initiated from said transceiving apparatus by the user, and said processing means only producing an alert signal in response to receipt of said signal having the correct mobile identification number of said transceiving apparatus; and means for indicating reception of radiotelephone signals coupled to said processing means.

2. The radiotelephone signal transceiving apparatus of claim 1, further comprising power means coupled to said processing means for providing power thereto, said power means including means for monitoring the status thereof and means for providing an indication when said power means falls below a desired level.

3. The radiotelephone signal transceiving apparatus of claim 1 wherein said indicating means comprises a vibrating mechanism.

4. The radiotelephone signal transceiving apparatus of claim 1 wherein said indicating means comprises an electronic circuit for producing an audible signal.

5. The radiotelephone signal transceiving apparatus of claim 1 wherein said radiotelephone communications system is connected to a toll system so as to only receive incoming toll calls for said radiotelephone signal transceiving apparatus.

6. A keyless radiotelephone signal transceiving apparatus operative in a radiotelephone communications system comprising:

a housing with no keypad thereon and no keypad circuitry therein, so that said transceiving apparatus is a one-way incoming call receiving apparatus only, and no outgoing signals may be initiated by a user on said apparatus;

integrated receiving means and transmission means in said housing for receiving and transmitting radiotelephone signals;

processing means in said housing coupled to the integrated receiving means and transmission means, said processing means processing received signals and only transmitting radiotelephone signals in response to receipt of a signal having the correct mobile identification number of said transceiving apparatus, said processing means having no means for creating an outgoing addressing signal, so that no radiotelephone signals may be initiated from said transceiving apparatus by the user;

means for indicating reception of radiotelephone signals coupled to said processing means in said housing; and power means coupled to said processing means for providing power thereto, said power means including means for monitoring the status thereof and means for providing an indication when said power means falls below a desired level.

7. The keyless radiotelephone signal transceiving apparatus of claim 6 wherein said radiotelephone communications system is connected to a toll system so as to only receive incoming toll calls for said keyless radiotelephone signal transceiving apparatus.

8. A keyless radiotelephone transceiving apparatus operative in a radiotelephone communications system, comprising:

a hollow body member having a substantially flat recessed face with no keypad thereon and no keypad circuitry therein, so that said transceiving apparatus may only function as a one-way incoming call receiving apparatus;

an antenna for receiving and transmitting radiotelephone signals, said antenna retained in said hollow body member;

a transmitter for transmitting radiotelephone signals coupled to said antenna in said hollow body member;

a processor retained in said hollow body member and coupled to said antenna and to said transmitter, said processor processing received signals and only transmitting radiotelephone signals in response to receipt of a signal having the correct mobile identification number of said transceiving apparatus, said processor having no means for creating an outgoing addressing signal, so that no radiotelephone signals may be initiated from said transceiving apparatus by a user;

indicating means for only indicating reception of radiotelephone signals coupled to said processor in said hollow body member;

a flip element rotatably coupled to said hollow body member and sized and dimensioned to reside in said recessed face portion when said flip element is in a closed position, said flip element having a microphone affixed therein and activating said keyless radiotelephone transceiving apparatus when moved to the opened position; and at least one switching means located on said hollow body member, said at least one switching means being actuated by the opening and closing of said flip element, for activating and deactivating said transceiving apparatus, said processor, and said indicating means.

9. The keyless radiotelephone signal transceiving apparatus of claim 8 wherein said indicating means comprises a vibrating mechanism for vibrating said body member in response to received radiotelephone signals.

10. The keyless radiotelephone signal transceiving apparatus of claim 8 wherein said indicating means comprises an electronic circuit for producing an audible signal.

11. The keyless radiotelephone signal receiving apparatus of claim 10 wherein said apparatus is connected to a toll system so as to only receive incoming toll calls.

12. The keyless radiotelephone signal transceiving apparatus of claim 8 wherein said at least one switching means includes separate switching means actuated by said flip element for activating and deactivating said processor.

* * * * *